Feb. 21, 1961   J. McEWAN   2,972,266
SAW SHARPENER
Filed March 21, 1958   2 Sheets-Sheet 1
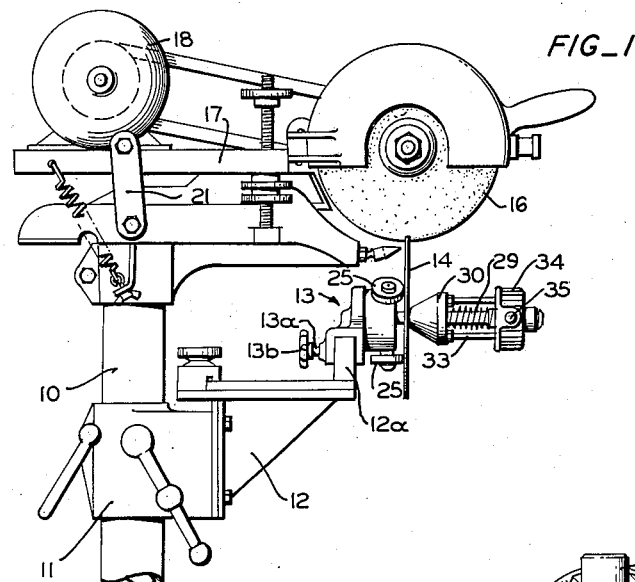
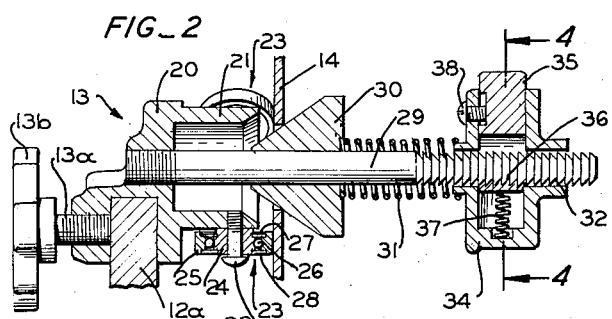
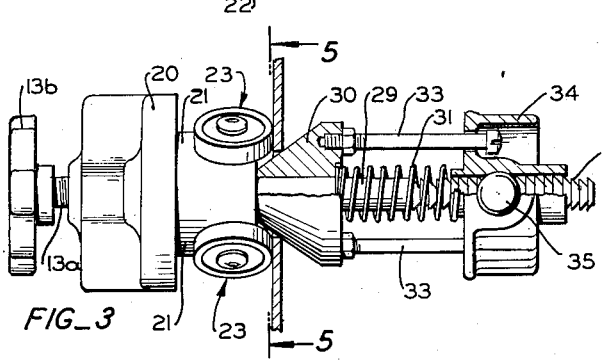
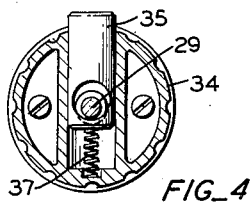
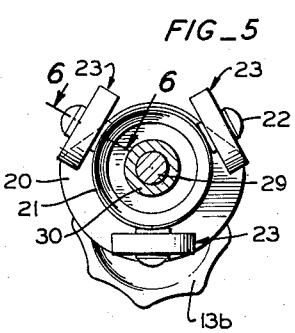
INVENTOR.
JAMES McEWAN
BY
*Allen + Chromy*
ATTORNEYS

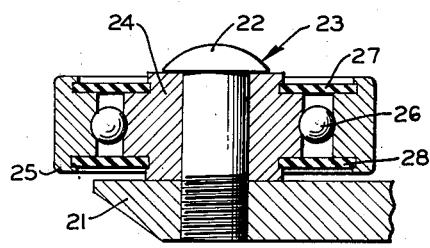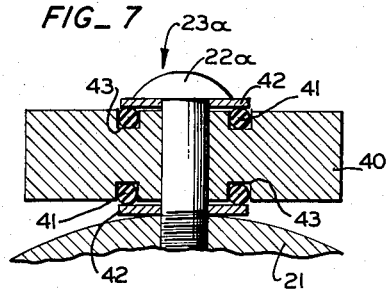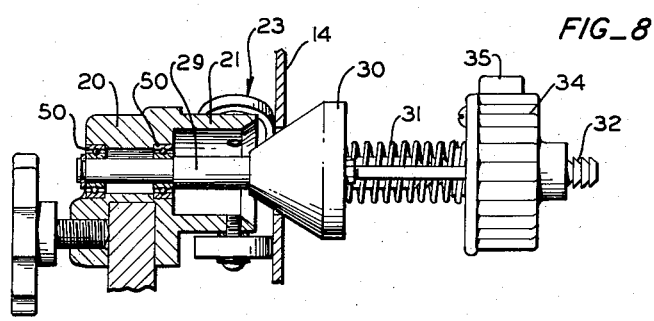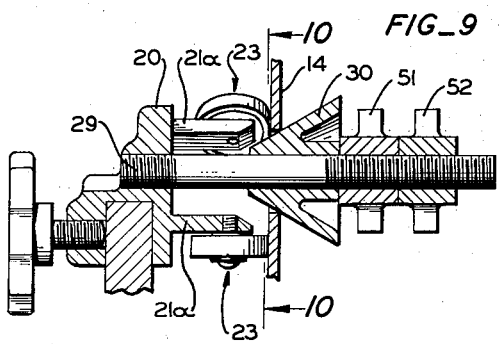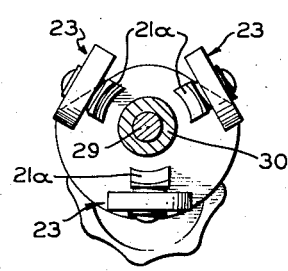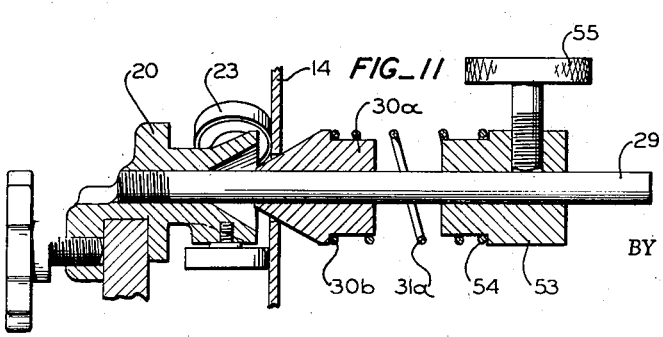

United States Patent Office 2,972,266
Patented Feb. 21, 1961

2,972,266

SAW SHARPENER

James McEwan, 138 Stockton Ave., San Jose 11, Calif.

Filed Mar. 21, 1958, Ser. No. 722,978

14 Claims. (Cl. 76—79)

The present invention relates to saw holders and is concerned more particularly with the provision of a holder or clamp for circular saws and similar devices to be used for example in sharpening saws and the like.

It is a general object of the invention to provide an improved device for holding saws in a saw sharpener.

Another object of the invention is to provide an improved saw holder in which the clamping structure can be moved immediately to clamping position with respect to the saw and releasably latched in clamping position, at the same time providing a clamp that permits easy rotation of the saw.

A further object of the invention is to provide an improved saw holder having a ratchet clamp holding means and also having a plurality of rollers so that the saw may be clamped between the rollers and the holding means to provide free rotation thereof.

Still a further object of the invention is to provide an improved saw holder with a conical member adapted to engage the saw in the central aperture thereof between spaced planetary rollers that are positioned on the opposite side of the saw.

Other objects and advantages of the invention will be apparent from the following description of a preferred embodiment thereof, as illustrated in the accompanying drawings.

In accordance with this invention there is provided an improved saw holder that is adapted to hold circular saws in restrained rotation while the saw is being sharpened. This device is provided with a plurality of rollers which may be supported by suitable ball bearings or bronze sleeves in spaced positions around the exterior of a cylindrical member having a shaft fixed or rotatable in the center thereof. This shaft is arranged to support a conical member that is adapted to engage the circular saw in the central aperture thereof and this conical member is urged against the saw by means of a spring clamp or nut so that the saw is pressed thereby against the aforesaid rollers to permit free rotation thereof.

Figure 1 is a side elevational view of the upper portion of a saw sharpener employing the saw holder of the instant invention;

Figure 2 is an enlarged view, partially in section, of one form of clamping structure employed in this saw holder;

Figure 3 is also an enlarged view of the saw holder similar to Figure 2 showing the spring urged clamping member in a different position;

Figure 4 is a detail sectional view of the clamping structure taken along the line 4—4 in Figure 2.

Figure 5 is a sectional view taken along the line 5—5 of Figure 3;

Figure 6 is a sectional view taken along the line 6—6 of Figure 5;

Figure 7 is a view similar to Figure 6 showing a different type of roller construction.

Figure 8 is a view similar to Figure 2 showing a saw holder in which the shaft is rotatable;

Figure 9 is a view of a saw holder in which the saw engaging rollers are supported by fingers and the cone is rotatably positioned on the shaft and held against the saw by a pair of nuts;

Figure 10 is a sectional view taken along the line 10—10 of Figure 9; and

Figure 11 is a sectional view showing another saw holder embodiment.

Referring to Figure 1, there is illustrated a saw sharpener including a supporting post 10 on which there is adjustably mounted a support casting 11 for an adjustable bracket 12 on which is positioned an upright bar on slide 12a. The saw holder 13 is clamped to the slide 12a by means of the clamping bolt 13a that is provided with a handle 13b. The saw 14 is shown in place on the support 13. The saw sharpener as illustrated also includes a sharpening wheel 16 carried by a bracket 17 on which its drive motor 18 is also mounted. The bracket 17 is supported and connected by respective links 21 and 22 on a dust chute 23 at the top of the post 10. The saw sharpener is of the construction described and claimed in my Patent No. 2,590,992 for a Saw Sharpener.

Referring to the saw holder in detail, the holder 13 is provided with a member 20 that is made of material such as cast iron and this member is provided with a groove to slidably engage the slide 12a of the bracket 12 on which it is secured in adjusted position by a screw 13a. The member 20 includes a recessed cylindrical portion 21 on which are mounted three screws or studs 22 which extend radially from the outer surface thereof and on which are mounted ball bearing assemblies 23. Each of these assemblies 23 include an inner race 24, an outer race 25, a plurality of ball bearings 26 positioned between these races and sealing washers 27 and 28 supported by the races for preventing dust and grindings resulting from saw sharpening operations, from entering the bearing assembly. The inner race 24 of each assembly portion 21 of the member 20 by the screws 22 and the outer race of each assembly is adapted to engage the saw blade 14. Centrally of the recessed portion 21 the member 20 carries a support shaft 29 that is threaded into said member, and at its outer end the support shaft 29 is provided with a series of annular ratchet teeth 32.

To hold the saw against the ball bearing assemblies 23, the clamping structure includes a saw engaging cone 30 slidably and rotatably mounted on the shaft 29 in free detachable fashion. The cone 30 carries a pair of connecting bolts 33 slidably secured in a recessed securing element or collar 34 which is also slidable and rotatable with respect to the shaft 29. The bolts 33 limit relative outward movement between the cone 30 and the collar 34 while permitting adjustment of the parts toward each other. A spring 31 is interposed between the cone 30 and the collar 34 to urge them apart and to urge the cone 30 and the saw 14 thereon toward the abutment bearing assemblies 23. The collar 34 is provided with a radial recess intersecting its center aperture and receiving a ratchet button 35 apertured to engage over the shaft 29. The button 35 is provided with ratchet teeth 36 for engagement with the ratchet teeth 32 of the support shaft under the influence of a compression spring 37 seated in the collar 34. A pin which may take the form of a screw 38 in the collar 34 engages a suitable slotted recess in the button 35 to maintain the button within the collar 34.

As shown in Figure 2, the ratchet teeth 36 of the button 34 are engaged with the ratchet teeth 32 of the shaft 29 so that the cone 30 is urged by the spring 31 to engage in the central hole of the saw 14 and to clamp the saw against the bearing assemblies 23. To release the saw and remove the clamping structure, the button 35 is depressed to free the teeth 36 from the teeth 32 so that the entire clamping structure can be freely withdrawn as a unit from the shaft 29. If additional spring pressure is desired in holding the saw 14 in place, the securing collar 34 is moved to the left as viewed in Figures 2 and 3 on the shaft 29 so that it will be secured in a more adjacent position to the cone 30 and provide additional compression of the spring 31.

It will be noted that, by virtue of the rotative connection between the ratchet teeth 32 of the shaft 29 and the teeth 36 of the latch button 35, as the saw 14 is rotated to adjust its position with respect to the sharpening device the clamping structure including the cone 30 can rotate with it so that no wear is caused between the sharp edge of the saw and the cone 30. Also, the clamping structure can be freely engaged and disengaged from the shaft 29 without reference to any special rotative positioning thereof, enabling fast installation and removal of saws from the sharpener.

In Figure 7 there is shown a sectional view of a modified form of roller 23a that may be used in place of the ball bearing rollers 23 if desired. Three of the rollers 23a would of course be employed in place of the three ball bearing rollers 23. The body 40 of the roller 23a may be of materials such as metal, plastic and the like and it is provided with a centrally disposed hole for receiving the mounting pin 22a which is threaded into the member 21. Annular recesses 43 are provided on each side of the body 40 to receive the washers 41 which may be tightly fitted into these recesses and locked in place by the O-ring washers 42 so as to form seals therewith and thereby prevent grindings, produced in the saw sharpening operations, from entering the bearing surfaces between the body 40 and the mounting pin 22a. The body 40 is mounted so as to be freely rotatable on the pin 22a when the saw 14 engaged thereby is turned. Pressure applied thereto by the cone 30 and spring 31, may be adjusted as described by positioning the collar 34 in different positions on the shaft 29.

In Figure 8 there is shown an embodiment of this invention in which the shaft 29 instead of being threaded into the member 20 as shown in Figure 2, is provided with ball bearing assemblies 50 for rotatably supporting said shaft in said member. Accordingly, with this arrangement the shaft 29 as well as the cone 30, spring 31 and retaining collar 34 are rotated when the saw 14 is rotated.

A further modification is shown in Figures 9 and 10 in which the shaft 29 is threaded into the member 20 and in which the cone 30 is held against the saw 14 by the nuts 51 and 52 which lock each other against undesired rotation. A pair of nuts 51 and 52 is employed so that when the saw 14 and the cone 30, holding said saw, are rotated the nuts 51 and 52 which lock each other against rotation, will hold the cone 30 firmly in position in the aperture of the saw and the saw is thus held against the rollers 23. In this case the rollers 23 are supported on fingers 21a, that extend from the member 20, instead of being supported on a hollow member such as the member 21 as shown in Figure 2, although the hollow member may be employed if desired. This form of the invention is employed when sharpening large saws in preference to the form of the invention using a spring such as the spring 31, which furnishes the pressure for pressing the cone 30 against the saw.

Another modification of this invention is shown in Figure 11 in which the shaft 29 is also threaded into the support 20 although this shaft may be provided with bearings such as the bearings 50 shown in Figure 8 if desired. In this modification a plurality of rollers 23 which may be constructed as shown in Figure 6 or Figure 7, is mounted on the support member 20 and these rollers engage the saw 14 on one side thereof. The cone 30a is pressed into the central aperture of the saw 14 by the spring 31a, one end of which engages this cone in a circumferential recess portion 30b. The other end of the spring 31a engages the member 53 in a similar circumferential recess portion 54 and this member 53 is held in any predetermined position on the shaft 29 by means of the hand screw 55. By adjusting the position of the member 53 on the shaft 29, suitable pressure may be applied to the cone 30a through the spring 31a. The cone 30a in turn presses the saw 14 against the rollers 23 and the saw is rotatably supported on the shaft 29 during the saw sharpening operation.

While I have shown a preferred embodiment of the invention, it will be understood that the invention is capable of variation and modification from the form shown so that its scope should be limited only by the scope of the claims appended hereto.

What I claim is:

1. In a circular saw holder, a support member having a shaft projecting therefrom, said support member having a plurality of rotatable elements supported in spaced relation thereon for rolling engagement with the saw at spaced points, and a saw clamping cone slidably mounted on said shaft for engaging the circular saw in the central hole thereof and holding it against said rotatable elements in centered relation with respect to said shaft, said rotatable elements being spaced around said shaft and being substantially unyieldingly supported opposed to said clamping cone so that they press the saw symmetrically onto said cone whereby said saw may be rotated without wobble.

2. In a circular saw holder, a support member having a shaft projecting therefrom, said support member having a plurality of rotatable elements supported in spaced relation thereon for rolling engagement with the saw at spaced points, a saw clamping cone slidably mounted on said shaft for engaging the circular saw in the central hole thereof and holding it against said rotatable elements in centered relation with respect to said shaft, said rotatable elements being spaced around said shaft and being substantially unyieldingly supported opposed to said clamping cone so that they press the saw symmetrically onto said cone whereby said saw may be rotated without wobble, a collar slidably mounted on said shaft, means for holding said collar in any selected position on said shaft, and a spring interposed between said collar and said cone for pressing said cone against said saw.

3. In a circular saw holder, a support member having a shaft projecting therefrom, said support member having a plurality of rotatable elements supported in spaced relation thereon for rolling engagement with the saw at spaced points and a saw clamping cone slidably mounted on said shaft for engaging the circular saw in the central hole thereof and holding it against said rotatable elements in centered relation with respect to said shaft, said rotatable elements being spaced around said shaft and being substantially unyieldingly supported opposed to said clamping cone so that they press the saw symmetrically onto said cone whereby said saw may be rotated without wobble, a series of ratchet teeth on said shaft, a ratchet collar slidably mounted on said shaft including means for engaging said teeth, and a spring interposed between said collar and said cone.

4. In a circular saw holder, a support member having a shaft projecting therefrom, said support member having at least three rotatable elements and means for supporting said rotatable elements in circumferentially spaced relation on said support member for rotation about respective axes transverse to said shaft for rolling engagement with the saw at spaced points, and a saw clamping cone slidably mounted on said shaft for engaging the circular saw in the central hole thereof and holding it against said rotatable elements in centered relation with respect to said shaft.

5. In a circular saw holder, a support member having a shaft projecting therefrom, said support member having a plurality of rotatable elements and ball bearing means for supporting said rotatable elements in spaced relation on said support member for rolling engagement with the saw at spaced points and a saw clamping cone slidably mounted on said shaft for engaging the saw and holding it against said rotatable elements in centered relation with respect to said shaft, said rotatable elements being spaced around said shaft and being substantially unyieldingly supported opposed to said clamping cone so that they press the saw symmetrically onto said cone whereby said saw may be rotated without wobble, a collar slidably mounted on said shaft, means for holding said collar in any selected position on said shaft, and a spring interposed between said collar and said cone for pressing said cone against said saw.

6. In a circular saw holder, a support member having a shaft projecting therefrom, said support member having a plurality of rotatable elements and ball bearing means for supporting said rotatable elements in spaced relation on said support member for rolling engagement with the saw at spaced points and a saw clamping cone slidably mounted on said shaft for engaging the saw and holding it against said rotatable elements in centered relation with respect to said shaft, said rotatable elements being spaced around said shaft and being substantially unyieldingly supported opposed to said clamping cone so that they press the saw symmetrically onto said cone whereby said saw may be rotated without wobble, a series of ratchet teeth on said shaft, a ratchet collar slidably mounted on said shaft including means for engaging said teeth, and a spring interposed between said collar and said cone.

7. In a saw holder as set forth in claim 1 further characterized in that said shaft is fixedly attached to said support member and said cone is rotatably supported on said shaft.

8. In a saw holder as set forth in claim 1, further characterized in that means is provided for rotatably supporting said shaft in said support member.

9. In a saw holder as set forth in claim 8, further characterized in that said means comprises ball bearings positioned on said shaft and lodged in a recess formed in said support member.

10. In a saw holder as set forth in claim 1, further characterized in that said rotatable elements are supported on fingers attached to said support member.

11. In a saw holder as set forth in claim 1, further characterized in that said cone is rotatably supported by said shaft, and a pair of nuts threaded to said shaft for holding said cone in engagement with the saw, said nuts being adapted to lock each other against rotation.

12. In a saw holder as set forth in claim 1, further characterized in that said rotatable elements comprise roller members having holes formed therethrough for receiving studs for rotatably attaching said rollers to said support member, each of said roller members having recesses formed therein surrounding the hole formed therethrough, O-ring washers positioned in said recesses and washers pressed against said O-rings to cooperate with said O-rings and prevent granular material from entering said holes.

13. In a saw holder as set forth in claim 1, further characterized in that said rotatable elements comprise at least three cylindrical members engaging said saw at equal distances from the center of the saw.

14. In a saw holder as set forth in claim 2, further characterized in that said collar is provided with means comprising a screw threaded into said collar for engagement with said shaft whereby said collar may be held in any selected position on said shaft.

References Cited in the file of this patent

UNITED STATES PATENTS

| | | |
|---|---|---|
| 471,168 | Daly | Mar. 22, 1892 |
| 501,769 | Dillon | July 18, 1893 |
| 862,724 | Fields | Aug. 6, 1907 |
| 1,117,595 | Oatley | Nov. 17, 1914 |
| 1,169,460 | Carpenter | Jan. 25, 1916 |
| 1,998,783 | Leach et al. | Apr. 23, 1935 |
| 2,115,712 | Gavin | May 3, 1938 |
| 2,213,413 | Shaw | Sept. 3, 1940 |
| 2,459,233 | Mall | Jan. 18, 1949 |
| 2,463,007 | Wheeler | Mar. 1, 1949 |
| 2,580,812 | McEwan | Jan. 1, 1952 |
| 2,774,258 | Engle | Dec. 18, 1956 |
| 2,775,146 | McEwan | Dec. 25, 1956 |

FOREIGN PATENTS

| | | |
|---|---|---|
| 530,078 | France | Sept. 24, 1921 |